United States Patent [19]

Alff et al.

[11] Patent Number: 5,143,458
[45] Date of Patent: Sep. 1, 1992

[54] BEARING WITH ROLLING ELEMENTS EQUIPPED WITH AN ADJUSTABLE INFORMATION PICKUP DEVICE

[75] Inventors: Denis Alff; Christian Hajzler, both of Annency, France

[73] Assignee: The Torrington Company, Torrington, Conn.

[21] Appl. No.: 667,204

[22] Filed: Mar. 11, 1991

[30] Foreign Application Priority Data

Apr. 18, 1990 [FR] France ............................... 90 04824

[51] Int. Cl.$^5$ ............................................. F16C 19/00
[52] U.S. Cl. ..................................... 384/448; 384/446
[58] Field of Search ............... 384/448, 446, 476, 484, 384/477, 624

[56] References Cited

U.S. PATENT DOCUMENTS

| 5,004,358 | 4/1991 | Varvello et al. ..................... 384/448 |
| 5,011,303 | 4/1991 | Caron ................................... 384/446 |
| 5,038,471 | 8/1991 | Peilloud et al. ..................... 384/448 |

*Primary Examiner*—Lenard A. Footland
*Attorney, Agent, or Firm*—John C. Bigler; Michael H. Minns

[57] ABSTRACT

An antifriction bearing for mounting in a housing bore. The antifriction bearing has a groove in one of the peripheral surfaces of the outer race, an annular encoder rotatable with the inner race, a sensor support including an arcuate band having an axially extending lip which matingly engages the groove in the outer race and a sensor removably attached to the sensor support.

16 Claims, 4 Drawing Sheets

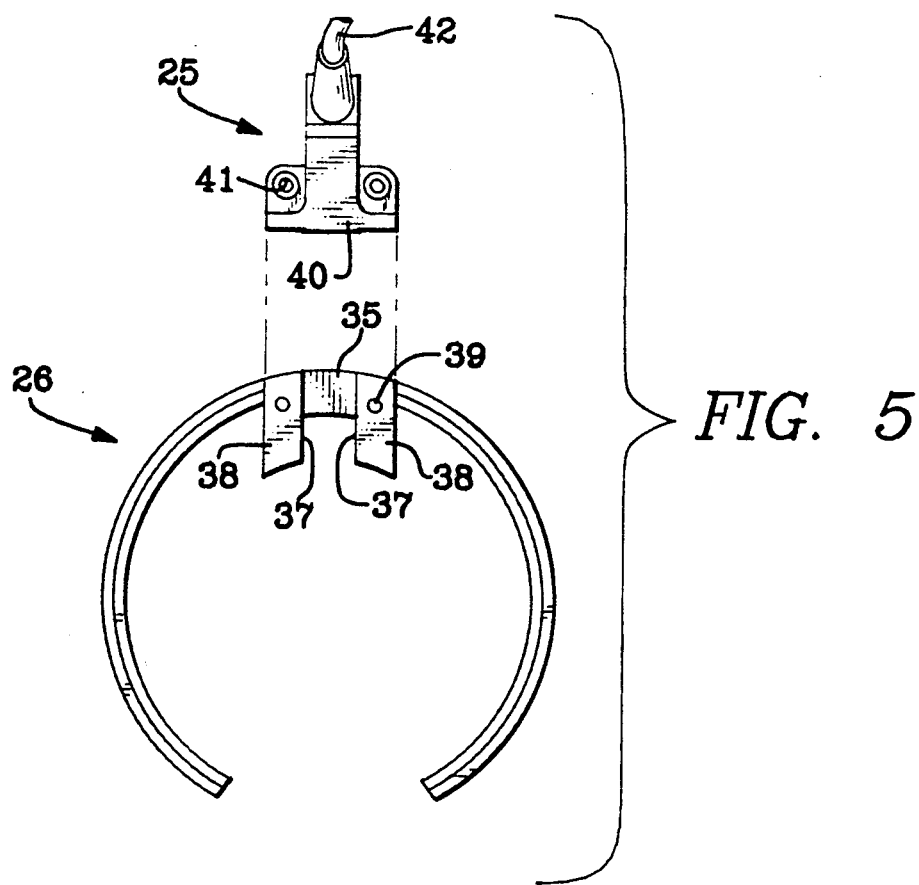
FIG. 5
FIG. 6
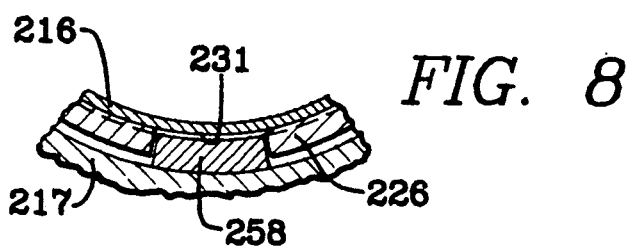
FIG. 8

5,143,458

BEARING WITH ROLLING ELEMENTS EQUIPPED WITH AN ADJUSTABLE INFORMATION PICKUP DEVICE

BACKGROUND OF THE INVENTION

This invention pertains to a bearing with rolling elements equipped with an adjustable information pickup device comprising an annular coding element, which rotates together with the revolving section of said bearing and moves in front of at least one fixed pickup, which is offset in relation to the coding element by a maximum value corresponding to the air gap permitted by the technology of the pickup. The pickup element is integral with a support which is fixed in relation to the revolving components holding the bearing.

W. German Patent No. 2,505,802 describes an information pickup device integrated into a bearing. This device requires a method of assembly which requires the exact angular positioning of the bearing to ensure the proper orientation of the information signal output wire.

When the bearing is held angularly in its mounting by retaining bands or by the force-fit of the lateral surfaces of the bearing, the effect of brief, strong mechanical stresses or the effect of variations in temperature leading to differential expansion can contribute to an angular displacement of the bearing in its mount. The data-transmitting electrical wires or the electrical connections may be pulled out as a result of the displacement of the pickup.

French Patent No. 2,618,516 describes a pickup connected to the outer ring of the bearing by a sheet metal element housed in an annular groove machined in the ring.

This arrangement does not guarantee the immobilization of the pickup, nor can the pickup be easily mounted in a hermetically sealed manner on some bearings.

French Patent No. 88-16,795 describes a pickup that is held in the desired angular position by a notched housing. This device requires the orientation of the bearing in relation to the notch when it is mounted in the housing.

The foregoing illustrates limitations known to exist in present bearings equipped with adjustable information pickup devices. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an antifriction bearing for mounting in a housing. The antifriction bearing has a groove in one of the peripheral surfaces of the outer race, an annular encoder rotatable with the inner race, a sensor support comprising an arcuate -band-. having an axially extending lip which matingly engages the groove in the outer race, and a sensor which is attached to the sensor support.

Other characteristics and advantages of the invention are explained in descriptions of the exemplary embodiments of the bearing shown in the attached drawings:

BRIEF DESCRIPTION OF THE DRAWING FIGURES

FIG. 5 is a lateral view of the support and of the pickup element shown in FIG. 4;

FIG. 6 is a plane view of a variant of the embodiment of the support element shown in FIG. 5;

FIG. 8 is a partial cross-sectional view along line VIII—VIII of FIG. 7 of the rotating stop device of the pickup element support.

DETAILED DESCRIPTION

According to the invention, the problems are solved in that the support of the pickup element has an annular configuration with a locking edge which cooperates with the sides of a groove in the outer ring of the bearing and with a retaining head of the pickup element.

The bearing thus ensures the exact axial and radial positioning of the pickup element opposite the coding element of the revolving part of the bearing to obtain a predetermined air gap while permitting the angular displacement of the pickup element.

The pickup element is immobilized in the angular direction by an outer fixed device in the design of the bearing.

Figure 1:
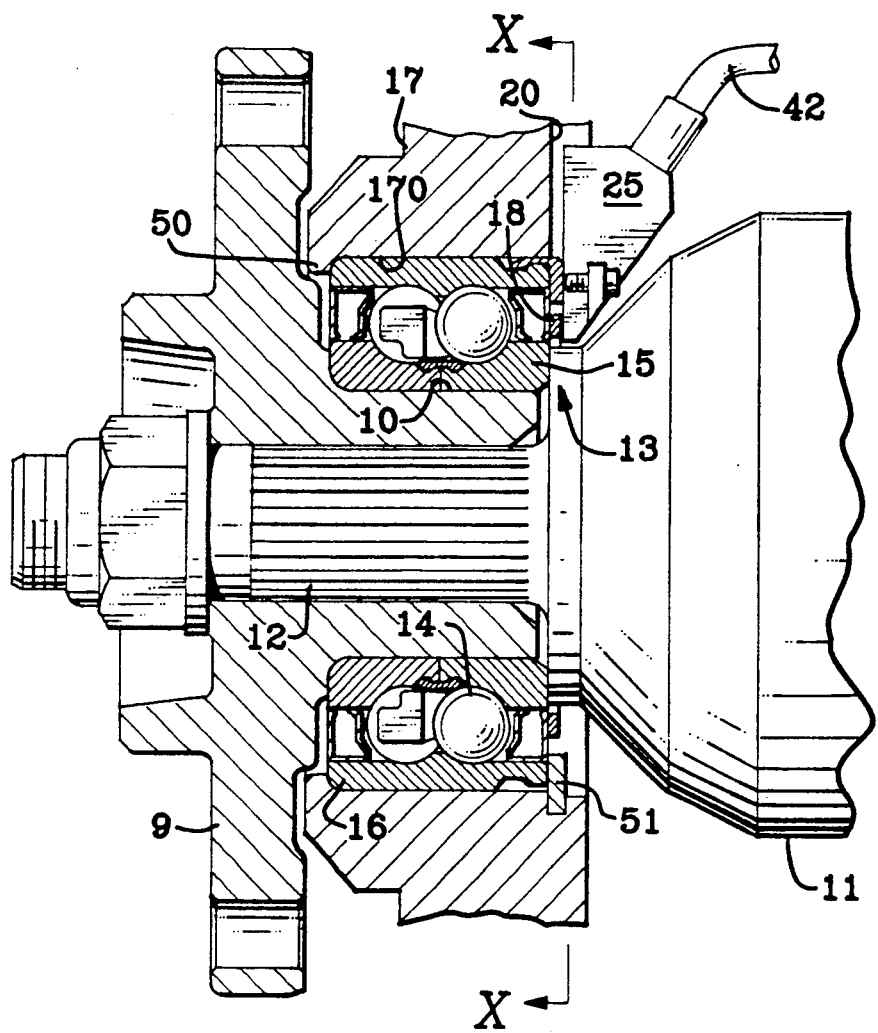
FIG. 1 is a cross-sectional view along line Y1-Y2 of FIG. 2 of an embodiment of a device for mounting a driving and steering wheel bearing, with the exception of the pickup.

The device shown in FIG. 1 comprising a bearing support surface 10 on a hub 9, driven by means of a grooved shaft 12, which is integral with the driven element 11 of a universal joint. A bearing 13, with two rows of rolling elements 14 between a split inner ring 15 and an outer ring 16, is mounted on support surface 10. Bearing 13 is sealed by, for example, two preassembled gaskets with sealing lips such as the seals described in U.S. Pat. No. 4,434,985.

Bearing 13 is mounted in a bore 170 in a housing element such as a support spindle 17 and rests against a shoulder 50 of said bore. It is axially immobilized by a stop ring 51.

Figure 3:
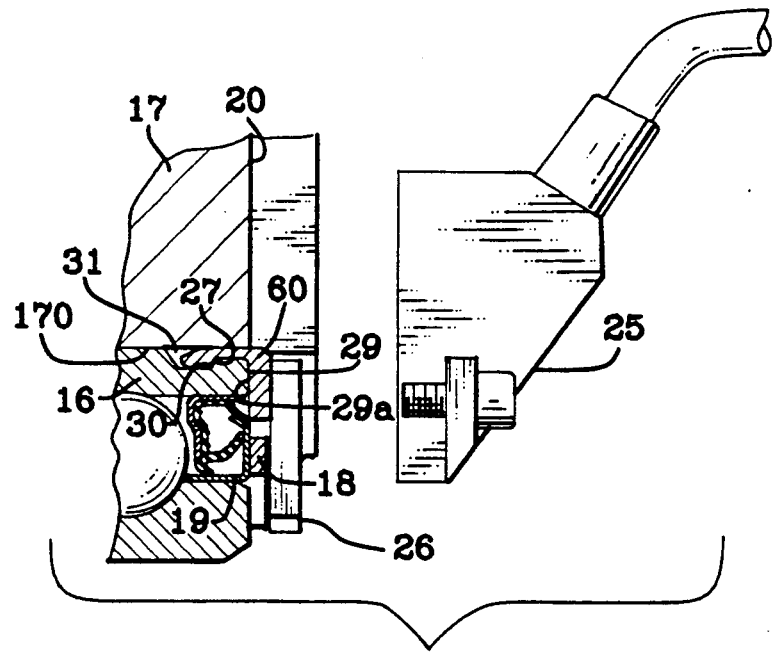
FIG. 3 is a larger-scale view of the mounting characteristics of the pickup element support shown in FIG. 1.

As shown in FIG. 3, an information pickup device comprises, in a known manner, a sensor 25 and a coding element 18, which rotates together with hub 9 and is attached to a deflector 19 of the sealing gasket of bearing 13. According to the example illustrated in FIG. 3, the coding element 18 is formed by a magnetic ring with multiple N-S poles attached to deflector 19 of the seal by any known locking means, such as adhesive bonding or casting on or simply by magnetization. Coding element 18 moves opposite sensor 25, which comprises one or more magnetic field sensors connected to electronic circuits.

Sensor 25 is connected to an annular support 26, which is mounted and held elastically in the manner of a stop ring on outer ring 16. The annular support 26 has a tapered locking edge 27, which cooperates with the complementary side 30 of a notch 31 machined in the outer cylindrical surface of ring 16. In addition, a support surface 29a rests elastically with a clamping action against surface 29 of outer ring 16. The elastic clamping force has a radial component, which has the effect of flattening annular support 26 in groove 31.

The outer annular surface 60 of annular support 26 is thus housed without any interference in bore 170. It is also possible for annular support 26 to be oval E, as shown in FIG. 6, to provide diametrically opposite points A and B, which provide an additional elastic clamping action in bore 170 of support spindle 17 to help prevent the support from vibrating in the bore.

Figure 4:
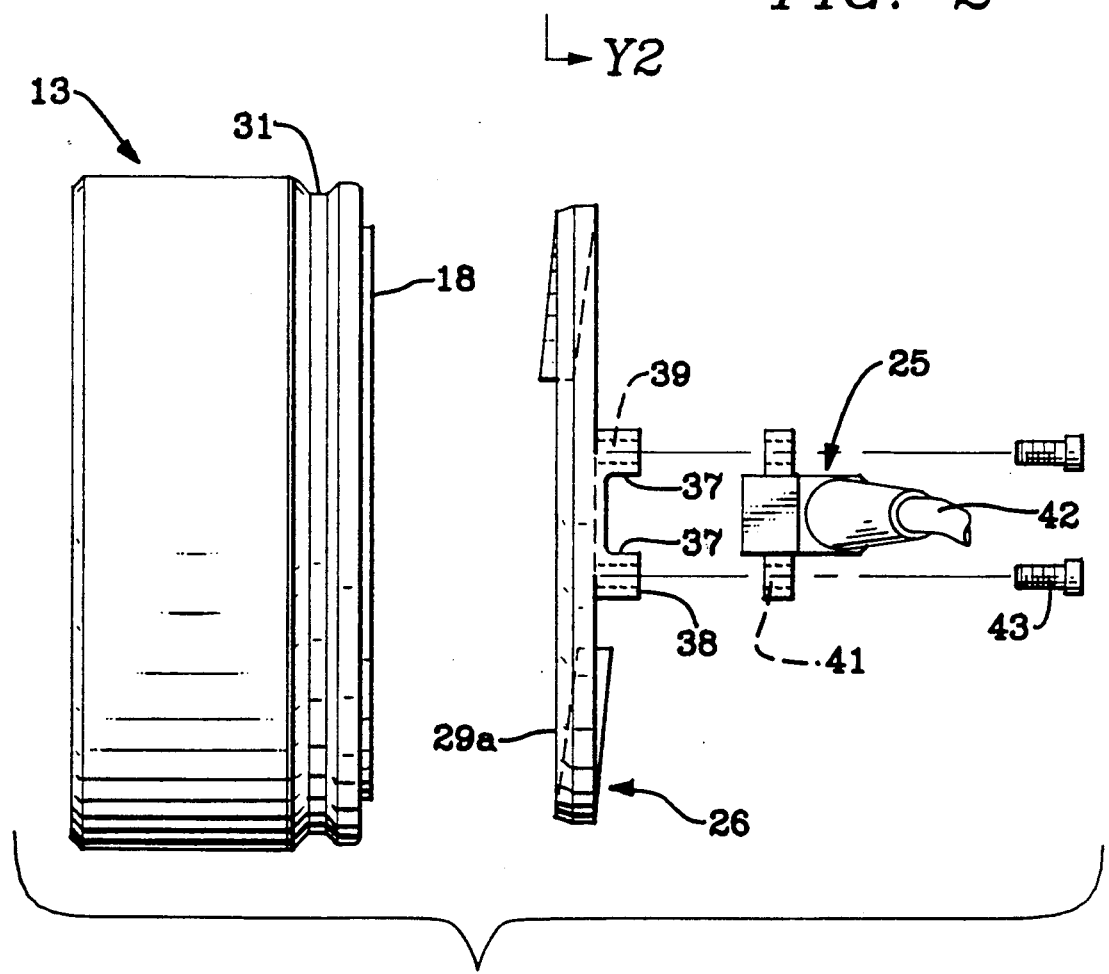
FIG. 4 is an expanded plan view in elevation of an embodiment of the separate components of the bearing before mounting.

Surface 29a of annular support 26 faces edge 27 and is part of a retaining head 35 for sensor 25. Retaining head 35, like the one shown in FIGS. 4 and 5, comprises a pair of flanges 38, through which two tapped holes 39 pass for screws 43, which attach sensor 25 in place. The inner surfaces 37 of flanges 38 form a guide surface for sensor 25. Sensor 25 is housed in a protective unit 40 with two mounting holes 41 corresponding to holes 39 and is also provided with connecting cable 42, which transmits the signals.

When the antifriction bearing equipped with annular support 26 is mounted in support spindle 17, as shown in FIG. 3, the ring-shaped part of annular support 26 is held in bore 170 of support spindle 17, along with outer ring 16. In addition, annular support 26 is also held by notch 31 of the outer ring 16. Therefore, the support cannot be pulled out.

On the other hand, nothing interferes with the relative rotation of annular support 26 in relation to outer ring 16. Thus, when bearing 13 is mounted in support spindle 17, the angular position of sensor 25 and its annular support 26 can be adjusted as desired.

Figure 2:
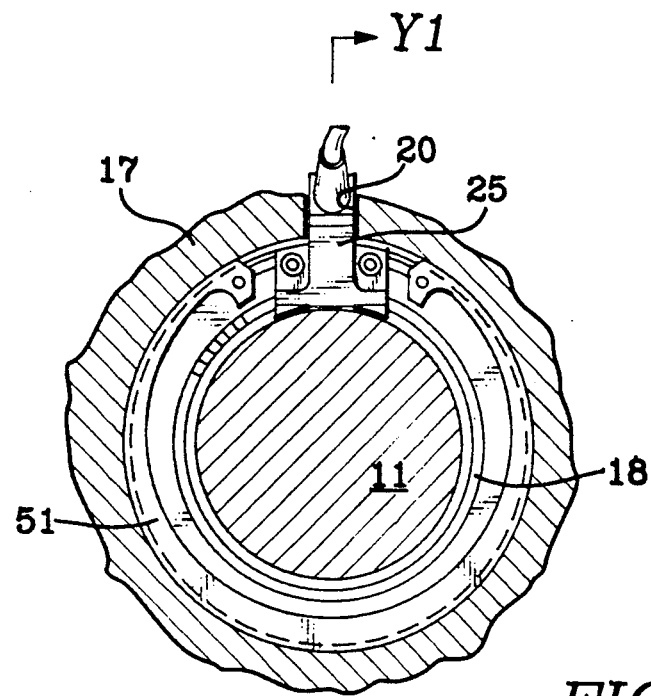
FIG. 2 is a cross-sectional view of the device taken along line X—X of FIG. 1.

As shown in FIG. 2, annular support 26 and sensor 25 are prevented from turning by a notch 20 in support spindle 17. Any stresses that might be created on the sensor 25 by accidental angular displacement of outer ring 16 in its housing are thus prevented.

In the example of the bearing described above, with reference to FIGS. 1-5, sensor 25 is attached to its support 26 by screws. This attachment is not limiting; any other known positive retaining system may be used. Moreover, when it is not necessary to remove sensor 25, devices 25, 26 can be, for example, in the form of an integral semi-annular resilient housing.

Figure 7:
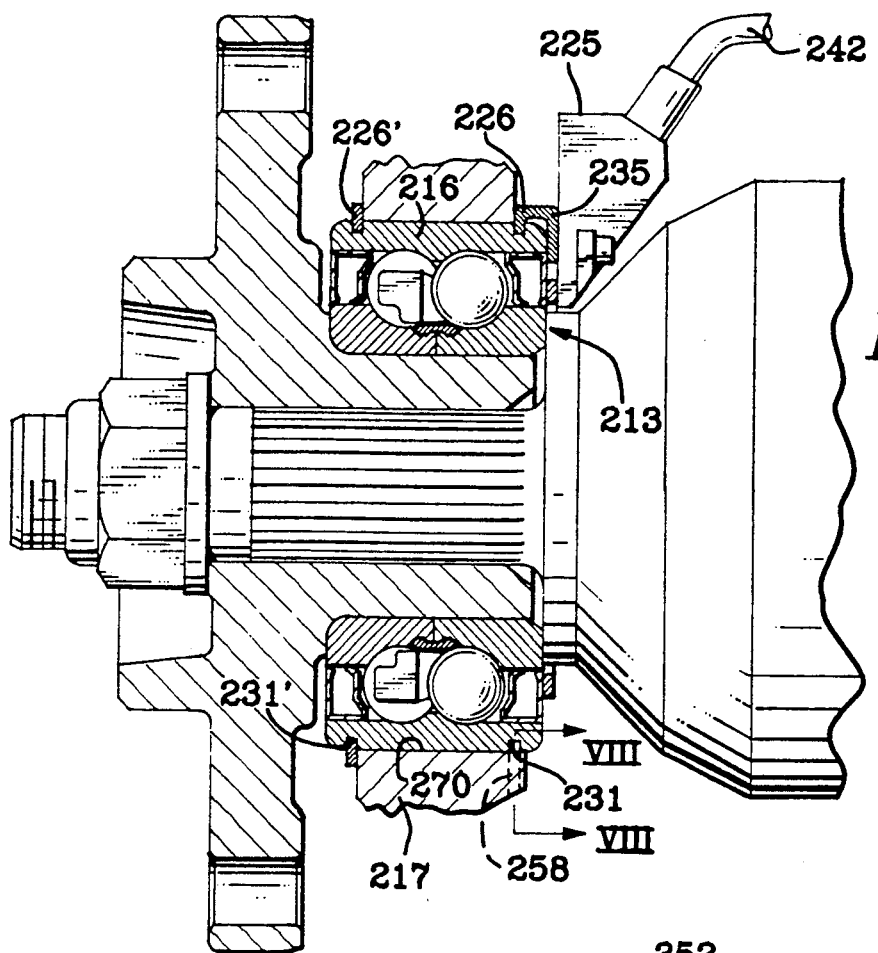
FIG. 7 is an axial cross-sectional view of an embodiment of a drive and steering wheel bearing.

The bearing shown in FIG. 7, wherein the reference numbers of the corresponding devices in FIG. 1 are increased by 200, comprises an outer ring 216 of a bearing 213, force-fit into bore 270 in a support spindle 217 and axially immobilized by slotted stop rings 226, 226' in notches 231, 231, in outer ring 216. Ring 226 has a radial retaining hook 235 bent back toward the center of the ring to provide a means of retaining pickup element 225 as described above.

As shown in FIG. 8, support spindle 217 has an axial projection 258 in the plane of notch 231 in outer ring 216. This axial projection 258 engages a slot in stop ring 226 to prevent the slotted stop ring 226 from turning after bearing 213 has been mounted in support spindle 217. The angular position of projection 258 on support spindle 217 is such that cable 242, which is integral with pickup element 225 mounted on retaining hook 235, has adequate slack.

Figure 9:
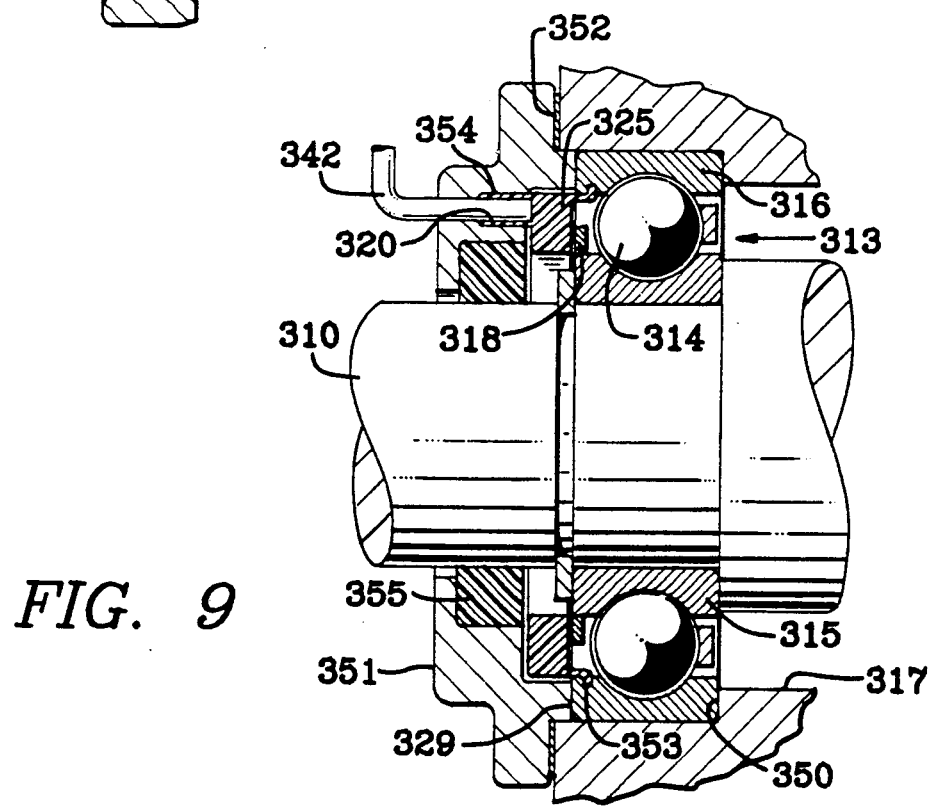
FIG. 9 is an axial cross-sectional view of a variant of the embodiment of a bearing with a row of roller elements.

Another embodiment of the invention is shown by FIG. 9. A rotating shaft 310 supports a bearing 313 with a row of rolling elements 314 between an inner ring 315 and an outer ring 316. Bearing 313 is mounted in a bore in a housing 317 and is supported against an axial positioning shoulder 350. The bearing 313 is axially immobilized by a cover 351, the axial position of which is adjusted by shims 352 with respect to surface 329 of outer ring 316 to prevent any axial movement of ring 316 in housing 317.

A seal 355 is located between cover 351 and shaft 310. An information pickup device comprising a coding element 318, rotates together with a rotating element such as inner ring 315. Coding element 318 moves opposite an annular-shaped sensor 325, which comprises one or more information element pickups connected to appropriate electronic circuits.

Sensor 325 is held axially in a notch 353 machined in the inner bore of outer ring 316. Therefore, it can be moved angularly in relation to said ring. Sensor 325 has an extension 354, which holds a connector cable 342.

Extension 354 is seated in a hole 320 in cover 351. Hole 320 thus constitutes the passageway for cable 342, which has a predefined angular position in relation to a reference point, constituted, for example, by the attachments of the cover to the housing.

Extension 354 is imperviously sealed by peripheral seals in hole 320, thus integrating the pickup element with cover 351 in the angular direction. When cover 351 is attached to housing 317, sensor 325 is thus prevented from rotating, and there is no danger of damage to it by accidental rotation of outer ring 316 in the housing as a result, for example, of differential expansion of the devices as a result of wide variations in temperature.

A goal of the invention is to correct the above-described problems, and it pertains in particular to the pickup and/or the way in which the pickup is supported.

Another goal of the invention is to provide a means for assembling the pickup device which prevents any contact between it and the outer surfaces of the bearing required for positioning and holding said device Another goal of the invention is to provide a pickup device which can be mounted and removed without special tools and without affecting the bearing itself. The bearing can thus operate with or without the device.

Having described the invention, what is claimed is:

1. An antifriction bearing for mounting in a housing, the antifriction bearing comprising:
   an outer race having an outer peripheral surface and an inner peripheral surface, one of the peripheral surfaces having a groove;
   an inner race rotatable relative to the outer race;
   a plurality of rolling elements located between the inner and outer races;
   an annular encoder rotatable with the inner race;
   a sensor support comprising an arcuate band having an axially extending lip which matingly engages the groove in the outer race such that, before mounting of the bearing in the housing and before attachment of a sensor, the sensor support is fixed radially and axially with respect to the outer race while permitting angular displacement therebetween; and
   a sensor removably attached to the sensor support.

2. A bearing as in claim 1 wherein the housing has a bore and a notch extending from the bore such that the sensor matingly engages the notch and limits angular displacement of the sensor support with respect to the housing when the bearing is mounted in the housing and the sensor is attached to the sensor support.

3. The bearing as in claim 1 wherein the groove is located in the outer peripheral surface of the outer race.

4. The bearing as in claim 3 wherein at least a portion of the axially extending lip of the sensor support is located within the bore of the housing.

5. The bearing as in claim 1 wherein the arcuate band is oval.

6. The bearing as in claim 1 wherein the sensor support arcuate band is a split ring having two free ends.

7. The bearing in accordance with claim 6 wherein the housing has a projection located within the bore, the projection being located between the free ends of the sensor support arcuate band whereby rotation of the sensor support arcuate band is prevented.

8. The bearing in accordance with claim 6 wherein the free ends of the sensor support arcuate band project from the plate of the sensor support arcuate band at an oblique angle whereby the projecting free ends elastically retain the sensor support arcuate band within the groove in the outer race.

9. The bearing as in claim 1 wherein the sensor support arcuate band also retains the outer race within the bore of the housing.

10. The bearing as in claim 1 wherein the groove is located in the inner peripheral surface of the outer race.

11. The bearing as in claim 1 further comprising:
a cover having an aperture for a shaft, the cover being stationary with respect to the housing, the cover having an opening whereby the sensor matingly engages the opening thereby preventing rotation of the sensor support arcuate band.

12. The bearing as in claim 1 wherein the sensor support is free to rotate with respect to the outer race to permit angular adjustment of the sensor support when the outer race is mounted in a bore of the housing and the sensor is not attached to the sensor support.

13. An antifriction bearing for mounting in a housing, the antifriction bearing comprising:
an outer race having an outer peripheral surface and an inner peripheral surface, one of the peripheral surfaces having a groove;
an inner race rotatable relative to the outer race;
a plurality of rolling element located between the inner and outer races;
an annular encoder rotatable with the inner race;
a sensor; and
a sensor support comprising an arcuate band having an axially extending lip which matingly engages the groove in the outer race, the sensor being attached to the sensor support, the sensor support having a pair of flanges extending radially inward, the flanges guiding the sensor.

14. An antifriction bearing for mounting in a housing, the antifriction bearing comprising:
an outer race having an outer peripheral surface and an inner peripheral surface, one of the peripheral surfaces having a groove;
an inner race rotatable relative to the outer race;
a plurality of rolling elements located between the inner and outer races;
an annular encoder rotatable with the inner race;
a sensor; and
a means for supporting the sensor in a fixed radial position and a fixed axial position proximate the encoder, the means for supporting the sensor allowing angular displacement of the sensor with respect to the outer race when the bearing is not mounted in the housing or when the sensor is not attached to the means for supporting the sensor.

15. An antifriction bearing for mounting in a housing, the antifriction bearing comprising:
an outer race having an outer peripheral surface and an inner peripheral surface, the outer peripheral surface having a groove;
an inner race rotatable relative to the outer race;
an plurality of rolling elements located between the inner and outer races;
an annular encoder rotatable with the inner race;
a sensor support comprising an arcuate band having an axially extending lip which matingly engages the groove in the outer race; and
a sensor attached to the sensor support.

16. The bearing as in claim 15 wherein at least a portion of the axially extending lip of the sensor support is located within the bore of the housing.

* * * * *